Patented Dec. 26, 1922.

1,439,960

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

PURIFICATION OF HYDROFLUORIC ACID.

No Drawing.  Application filed September 29, 1921. Serial No. 504,161.

*To all whom it may concern:*

Be it known that I, HENRY HOWARD, a citizen of the United States, residing at Cleveland, in the county of Cuyahoga and State of Ohio, have invented certain new and useful Improvements in the Purification of Hydrofluoric Acid, of which the following is a specification.

This invention relates to a process of purifying hydrofluoric acid.

Hydrofluoric acid is produced commercially by distilling a mixture of sulfuric acid and finely divided fluorspar. Hydrofluoric acid is distilled off as a gas and any silica which is contained in the fluorspar is carried along with the hydrofluoric acid in the form of silicon fluoride or hydrofluosilicic acid. The hydrofluosilicic acid present in the gaseous hydrofluoric acid or in the solution prepared by dissolving the gas in water is an objectionable impurity which it is the object of my invention to remove.

I have discovered that if the mixture of gases produced by distilling a mixture of sulfuric acid and fluorspar is passed through a scrubber containing a solution of potassium sulfate the silicon fluoride or its equivalent hydrofluosilicic acid is all removed and retained in the scrubbing solution in the form of potassium silicofluoride leaving pure hydrofluoric acid gas to pass on. The scrubbing solution is kept sufficiently hot to avoid any material condensation of the hydrofluoric acid.

Potassium silicofluoride accumulates in the scrubbing liquid in the form of a precipitate which is removed either continuously or from time to time. The precipitate may be regarded as a final product of the process or it may be treated with sulfuric acid and the mixture distilled to produce hydrofluosilicic acid. The residue which contains potassium sulfate and some silica may be leached to separate the potassium sulfate from the silica and the potassium sulfate returned to the scrubbing solution.

A small quantity of the scrubber solution is removed either after each batch or continuously to prevent the accumulation of too much sulphuric acid resulting from the potassium sulphate. This liquid containing water, sulphuric acid and a hydrofluoric acid, can be conveniently utilized by adding it to the still in which the fluorspar is decomposed whereby the sulphuric acid content is utilized in the decomposition of fluorspar and hydrofluoric acid is distilled off and recovered.

My process therefore may be operated continuously for the production of pure hydrofluoric acid and potassium silicofluoride as a by-product in which case potassium sulfate must be supplied to the scrubbing solution to replace that which is consumed or the potassium sulfate may be regenerated and used over and over and hydrofluosilicic acid produced as a by-product of the process.

The value of the process may be appreciated when it is realized that it makes possible the use of ordinary gravelspar containing up to 8% of silica for the manufacture of pure hydrofluoric acid. Gravelspar can frequently be obtained at half the price of the so-called acid-spar ordinarily used in making pure hydrofluoric acid. Acid-spar is fluorspar carefully selected to be as free as possible from silica.

In the following claims hydrofluosilicic acid is intended to include silicon fluoride.

I claim:

1. Process of making hydrofluoric acid which comprises distilling a mixture of fluorspar and sulfuric acid and scrubbing the gaseous products with a solution of potassium sulfate.

2. Process of making hydrofluoric acid which comprises distilling a mixture of fluorspar and sulfuric acid, scrubbing the gaseous products with a solution of potassium sulfate, and separating potassium silicofluoride from the scrubbing solution.

3. Process of making hydrofluoric acid which comprises distilling a mixture of fluorspar and sulfuric acid, scrubbing the gaseous products with a solution of potassium sulfate whereby hydrofluosilicic acid is separated from the hydrofluoric acid product, separating potassium silico fluoride from the scrubbing solution, distilling the potassium silico fluoride with sulfuric acid whereby hydrofluosilicic acid and potassium sulfate are formed and returning the potassium sulfate to the scrubbing solution.

4. Process as defined in claim 1 in which hydrofluoric acid substantially free from hydrofluosilicic acid is obtained by the distillation of sulphuric acid and gravelspar, i. e. fluorspar containing substantial quantities of silica.

5. Process of purifying hydrofluoric acid containing hydrofluosilicic acid which comprises absorbing the hydrofluosilicic acid in a solution of potassium sulfate.

6. Process of separating hydrofluoric acid from a mixture of the same with hydrofluosilicic acid which comprises reacting upon the mixture with potassium sulfate.

In testimony whereof, I affix my signature.

HENRY HOWARD.